(12) United States Patent
Roberge

(10) Patent No.: US 11,040,780 B2
(45) Date of Patent: Jun. 22, 2021

(54) INERTIAL ENERGY STORAGE DEVICE

(71) Applicant: RAYTHEON TECHNOLOGIES CORPORATION, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 406 days.

(21) Appl. No.: 16/057,362

(22) Filed: Aug. 7, 2018

(65) Prior Publication Data

US 2020/0047895 A1 Feb. 13, 2020

(51) Int. Cl.
H02K 7/02 (2006.01)
B64D 27/02 (2006.01)
B64D 27/24 (2006.01)
B64D 35/04 (2006.01)
B64D 35/08 (2006.01)
H02J 15/00 (2006.01)

(52) U.S. Cl.
CPC .............. B64D 27/24 (2013.01); B64D 35/04 (2013.01); B64D 35/08 (2013.01); H02J 15/00 (2013.01); H02K 7/025 (2013.01); B64C 2201/042 (2013.01); B64C 2201/108 (2013.01); B64D 2027/026 (2013.01)

(58) Field of Classification Search
CPC .............. H02K 7/025; B64C 2201/042; B64D 2221/00
USPC .......................................................... 244/60
See application file for complete search history.

(56) References Cited

U.S. PATENT DOCUMENTS

| 1,774,804 | A | | 9/1930 | Marcus | |
| 5,614,777 | A | * | 3/1997 | Bitterly | F16F 15/30 310/74 |
| 5,890,441 | A | * | 4/1999 | Swinson | B64C 39/024 244/12.3 |
| 6,113,033 | A | * | 9/2000 | Parks | B64G 1/283 244/165 |
| 8,002,216 | B2 | | 8/2011 | Decker | |
| 8,632,319 | B2 | * | 1/2014 | Raymond | F02K 9/563 417/223 |
| 9,325,217 | B2 | | 4/2016 | Veltri | |
| 2006/0151666 | A1 | | 7/2006 | VanderMey et al. | |

(Continued)

FOREIGN PATENT DOCUMENTS

| CN | 105730446 A | 7/2016 |
| EP | 2842869 A1 | 3/2015 |
| JP | H1075504 A | 3/1998 |

OTHER PUBLICATIONS

European Search Report for European Application No. 19190369.9 dated Dec. 13, 2019.

*Primary Examiner* — Christopher P Ellis
(74) *Attorney, Agent, or Firm* — Carlson, Gaskey & Olds, P.C.

(57) ABSTRACT

An aircraft power system according to an exemplary embodiment of this disclosure includes, among other possible things, a battery, a motor/generator coupled to the battery, an inertial drum rotatable about an axis of rotation and coupled to the motor/generator, wherein the motor/generator drives rotation of the inertial drum in a first operating mode and is driven by the inertial drum in a second operating mode; and a housing defining a chamber for the inertial drum, the chamber filled with low-viscosity medium to reduce friction on the inertial drum.

16 Claims, 5 Drawing Sheets

(56) References Cited

U.S. PATENT DOCUMENTS

| | | | |
|---|---|---|---|
| 2010/0038473 A1 | 2/2010 | Schneider et al. | |
| 2011/0088507 A1 | 4/2011 | Fields | |
| 2012/0150364 A1* | 6/2012 | Tillotson | G05D 1/101 701/3 |
| 2012/0209456 A1* | 8/2012 | Harmon | B64D 35/08 701/3 |
| 2013/0261001 A1* | 10/2013 | Hull | F16C 32/0438 505/166 |
| 2015/0041598 A1* | 2/2015 | Nugent | B64C 39/022 244/53 R |
| 2015/0151847 A1* | 6/2015 | Krug | B64D 15/04 307/9.1 |
| 2015/0288271 A1* | 10/2015 | Kuznetsov | H02P 9/14 322/63 |
| 2015/0372581 A1* | 12/2015 | Morris | H02K 7/025 310/74 |
| 2016/0137304 A1* | 5/2016 | Phan | B64C 39/024 244/17.23 |
| 2016/0244176 A1* | 8/2016 | Xiao | H02P 5/74 |
| 2016/0311529 A1* | 10/2016 | Brotherton-Ratcliffe | B64D 35/06 |
| 2017/0012489 A1* | 1/2017 | Townend | H02K 1/02 |
| 2017/0163114 A1 | 6/2017 | Gieras et al. | |
| 2017/0225573 A1* | 8/2017 | Waltner | B64D 27/24 |
| 2017/0274993 A1* | 9/2017 | Beckman | B64C 11/48 |
| 2018/0003263 A1 | 1/2018 | Sanders et al. | |
| 2018/0178920 A1* | 6/2018 | Swann | F02C 9/54 |
| 2018/0244384 A1* | 8/2018 | Phan | B64D 27/24 |
| 2019/0199164 A1* | 6/2019 | Gieras | H02K 5/02 |
| 2019/0263519 A1* | 8/2019 | Argus | B64D 31/06 |
| 2020/0115045 A1* | 4/2020 | Mermoz | B64C 27/24 |
| 2020/0144887 A1* | 5/2020 | Romeu | B64G 1/425 |
| 2020/0164975 A1* | 5/2020 | Robertson | B64C 29/00 |
| 2020/0341492 A1* | 10/2020 | Thomassey | B64C 19/00 |
| 2021/0041895 A1* | 2/2021 | Kashawlic | G05D 1/0816 |

* cited by examiner

INERTIAL ENERGY STORAGE DEVICE

BACKGROUND

Electricity utilized onboard an aircraft is either produced by a generator or stored in a battery. Propulsion systems that use electric motors may require access to electric power in excess of what and be practically stored in batteries. Additional batteries that provide sufficient capacity for a few infrequent operational periods necessarily adds additional weight that is present during all operational conditions. The added weight can limit operational, performance and range capabilities of an aircraft.

SUMMARY

An aircraft power system according to an exemplary embodiment of this disclosure includes, among other possible things, a battery, a motor/generator coupled to the battery, an inertial drum rotatable about an axis of rotation and coupled to the motor/generator, wherein the motor/generator drives rotation of the inertial drum in a first operating mode and is driven by the inertial drum in a second operating mode; and a housing defining a chamber for the inertial drum, the chamber filled with low-viscosity medium to reduce friction on the inertial drum.

In a further embodiment of the foregoing aircraft power system, a clutch for selectively coupling the motor/generator to the inertial drum is included.

In a further embodiment of any of the foregoing aircraft power systems, the inertial drum comprises a plurality of rotors coupled together and the motor/generator through the clutch.

In a further embodiment of any of the foregoing aircraft power systems, the inertial drum comprises a plurality of integrally formed rotor portions and a shaft portion coupled to the motor/generator.

In a further embodiment of any of the foregoing aircraft power systems, including a cooling system cooling the motor/generator is included. The cooling system has conduits for circulating coolant to remove heat from the motor/generator.

In a further embodiment of any of the foregoing aircraft power systems, at least one bearing assembly supports rotation of the inertial drum. At least one bearing assembly comprises one of a rolling element, fluid film and magnetic bearing.

In a further embodiment of any of the foregoing aircraft power systems, a controller governs operation of the motor/generator in a first mode. In a first mode the motor/generator draws energy from the battery to drive rotation of the inertial drum. In a second mode, the inertial drum drives the motor/generator to generate electric energy.

In a further embodiment of any of the foregoing aircraft power systems, the controller is configured to operate the power system in the second mode in response to a demand for electric power that exceeds the electric power provided by the battery.

In a further embodiment of any of the foregoing aircraft power systems, a speed sensor measures a speed of the inertial drum and communicates a signal indicative of the speed of the inertial drum to the controller.

In a further embodiment of any of the foregoing aircraft power systems, a gearbox is coupled between the inertial drum. The motor/generator provides a change of speed between the inertial drum and the motor/generator.

An inertial energy storage device according to an exemplary embodiment of this disclosure includes, among other possible things, an external housing defining an interior space, the interior space filled with a low-viscosity medium; an inertial energy storage means supported within the interior space; and a motor/generator coupled to the inertial energy storage means and configured to rotate the inertial energy storage means in a first operating mode and be rotated by the inertial energy storage means in a second operating mode.

In a further embodiment of the foregoing inertial energy storage device, the inertial energy storage means comprises a plurality of rotor portions coupled to a shaft portion attached to the motor/generator.

In a further embodiment of any of the foregoing inertial energy storage devices, a clutch means for selectively coupling the motor/generator to the inertial energy storage means is included.

In a further embodiment of any of the foregoing inertial energy storage devices, a speed change means coupled between the inertial energy storage means and the motor/generator is included.

A method of operating an aircraft power system according to an exemplary embodiment of this disclosure includes, among other possible things, driving a motor/generator with input electric energy to rotate an inertial drum at a predefined rotational speed; decoupling the motor/generator from the inertial drum such that the inertial drum spins freely separate from the motor/generator; and coupling the motor/generator to the inertial drum such that the inertial drum drives the motor/generator to produce electric energy in response to a demand for power.

In a further embodiment of the foregoing method of operating an aircraft power system, a battery is coupled electrically to the motor/generator. The input energy for driving the motor/generator is provided by the battery. The electric energy generated by the motor/generator when driven by the inertial drum charges the battery.

In a further embodiment of the any of the foregoing methods of operating an aircraft power system, a speed sensor measures a speed of the inertial drum. A controller utilizes the measured speed to determine a remaining energy potential stored in the inertial drum.

In a further embodiment of the any of the foregoing methods of operating an aircraft power system, a controller controls coupling of the motor/generator and the inertial drum to supplement energy stored within the battery.

In a further embodiment of the any of the foregoing methods of operating an aircraft power system, the motor/generator is driven at a startup to rotate the inertial drum to a predefined speed. The motor/generator is decoupled once the predefined speed is attained. Monitoring the rotational speed of the inertial drum to determine the remaining potential energy is included.

In a further embodiment of the any of the foregoing methods of operating an aircraft power system, the stored potential energy is withdrawn in response to a power demand exceeding a capacity of the battery. Withdrawal of the potential energy is provided by coupling the inertial drum to the motor/generator to produce electric power.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
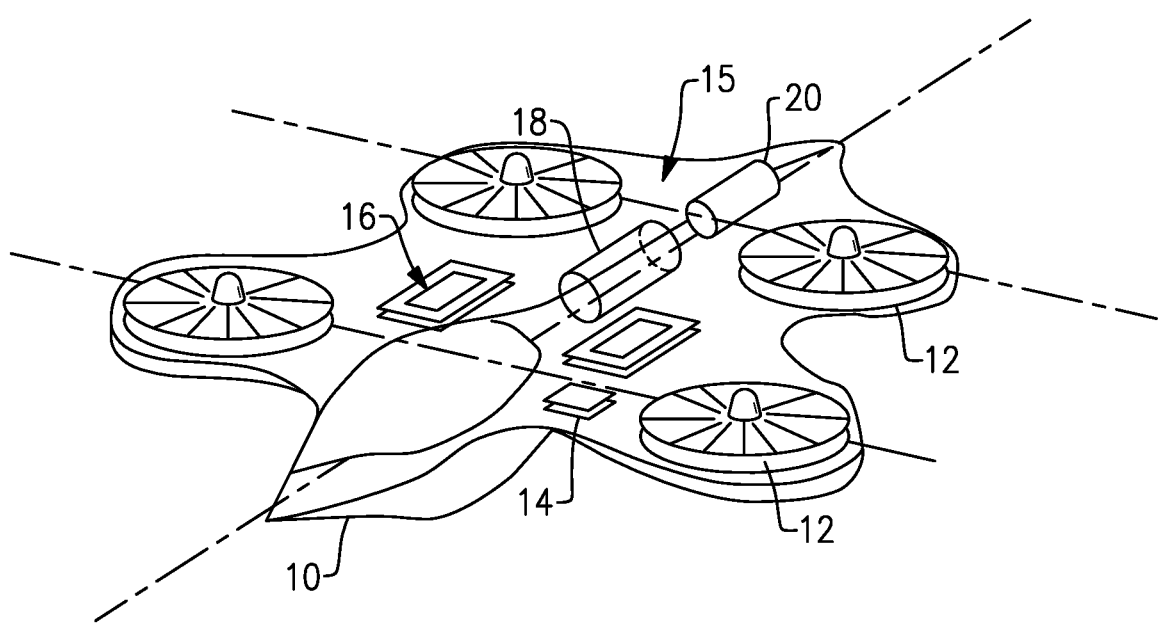
FIG. 1 is a schematic representation of an example aircraft including an example electric propulsion system.

FIG. 1 schematically illustrates an aircraft 10 that includes an electric power system 15 that power propulsors 12. The example power system 15 includes a battery system 16 and an inertial energy storage device 18. The propulsors 12 are electrically driven propellers or fans that provide lift and guidance of the example aircraft 10. Each of the propulsors 12 include an electric motor (not shown) that draw electric power from the battery system 16. The inertial energy storage device 18 supplements power provided by the battery system 16 during times of increased power demands and/or during times of degraded battery power state. Supplementing electric power provided by the battery system 16 with the inertial energy storage device 18 enables the use of battery systems 16 of reduced size and capacity. As appreciated, most operating conditions do not require peak power output and therefore, a battery system 16 that is sized to accommodate peak power demand would have excess capacity for most operating conditions. Moreover, the inertial energy storage device 18 may also provide initial energy to increase the duration of operation beyond the capacity of the battery system 16. The inertial energy storage device may also supplement available battery power at times of degraded battery performance, such as for example, during operation in an extremely cold environment.

Figure 2:
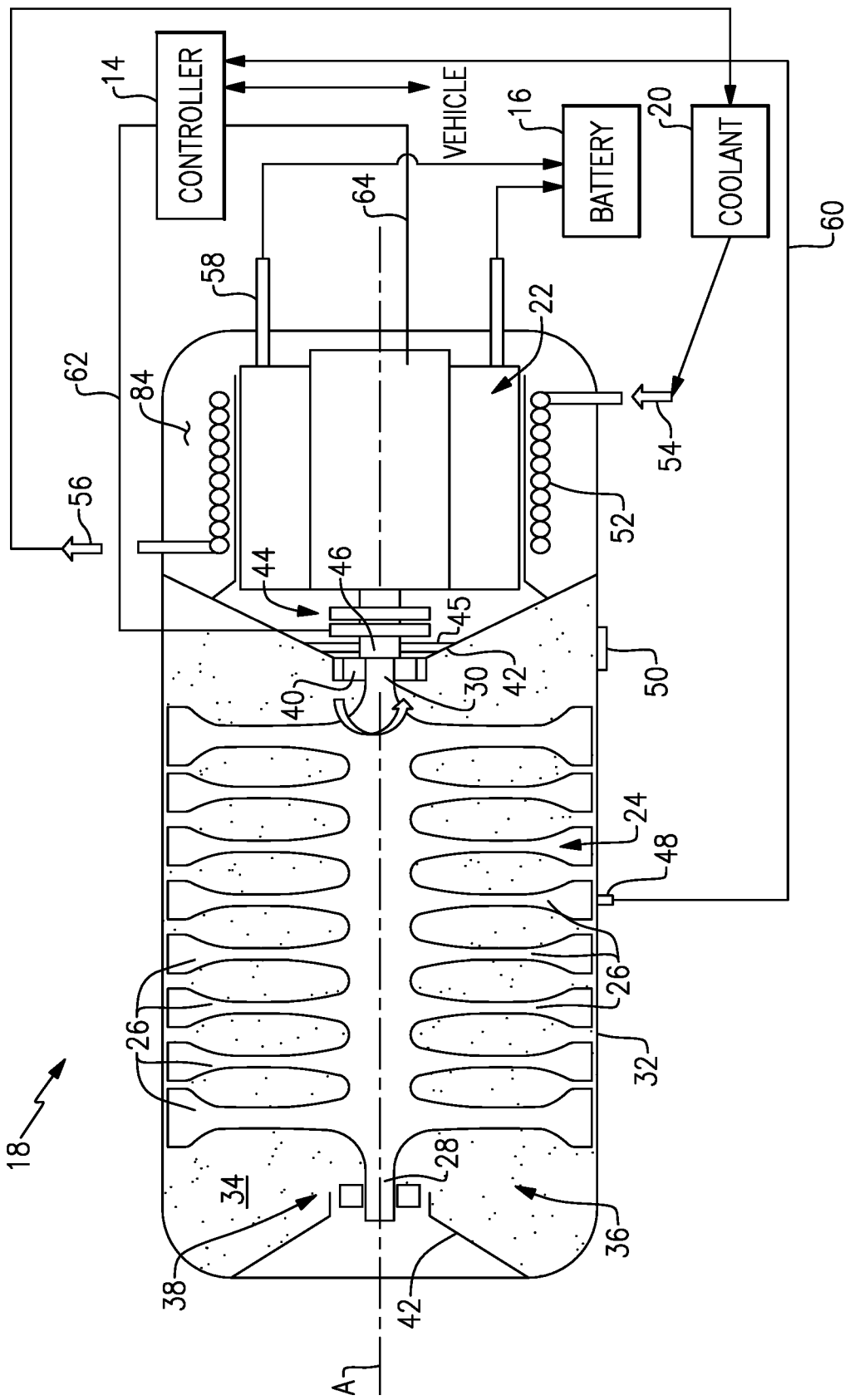
FIG. 2 is a cross-sectional view of an example inertial energy storage device embodiment.

Referring to FIG. 2, with continued reference to FIG. 1, the example inertial energy storage device 18 includes an inertial drum 24 that rotates about an axis A within a housing 32. The rotating inertial drum 24 stores potential energy that may latter be utilized to supplement electric energy stored in the power system 15. The inertial drum 24 rotates at high speeds in a reduced friction environment that provides little drag or energy loss due to windage heating of the internal environment. The inertial drum 24 will therefore rotate at the desired speed range for an extended period.

A housing 32 provides a sealed environment and defines an inner space 34 with a low viscosity. The low viscosity can be provided by a low viscosity medium 36 or by creating vacuum within the sealed environment. A tap 50 is provided to allow filling of the inner space with the medium 36. Alternatively, the tap 50 is utilized to create the vacuum within the sealed environment. Additionally, the low viscosity medium 36 provides the low friction environment within the inner space 34 that substantially reduces friction on the inertial drum 24. In one disclosed example, the low viscosity medium 36 is an inert gas. It should be appreciated that the low viscosity medium 36 could be any gas, liquid that reduces friction on the inertial drum 24. Medium may be at or near vacuum pressure condition or operating pressure lower than ambient environment pressure exterior to the housing 32.

The inertial drum 24 includes a plurality of rotor portions 26 that are coupled together and supported by shaft portions 28 and 30. The shaft portions 28, 30 are disposed at ends of the example drum 24. The rotors 26 are formed of a material that is capable of extreme high speed rotation. The material of the inertial drum 24 along with the configuration of the rotors provide a conservation of momentum when rotated to the desired operational speeds. Each of the rotors 26 extend radially outward from the shaft portions 28, 30 and include a significant mass at the radially outer most parts to aid in the conservation of rotational momentum. In this example, the inertial drum 26 is a one piece integral part with the rotors 26 and shaft portions 28, 30 all being a single part. However, it is within the contemplation of this disclosure that the inertial drum 26 may be formed from multiple parts that are secured together with fasteners, welding or other known material joining processes.

The example inertial drum 24 is supported by a forward bearing assembly 38 and an aft bearing assembly 40. The example bearing assemblies 38, 40 are low friction bearing systems that provide support for rotation without substantial friction. The example bearing assemblies 38, 40 may include a rolling elements, a fluid film, magnetic or other low friction bearing systems that do not produce substantial friction.

The motor generator 22 is disposed within the external housing 32. The external housing 32 is, in this example embodiment, sealed from the external environment but for electrical connections 58 to the battery systems 16 and coolant conduits utilized to communicate electric energy and coolant to the motor generator 22. The housing 32 includes bearing supports 42 that hold the bearings 38, 40 along the axis of rotation A. A seal 45 is provided near the bearing 40 to seal interior space 34 from the compartment 84 including the motor 22. The seal 45 provides for containment of the medium 36 within the interior space 34. In this example, the seal 45 is provide between the fixed bearing support 42 and the rotating shaft 46. It should be appreciated that although a schematic housing 32 is shown schematically, other configurations of the housing that defines an interior sealed space that is capable of holding a low viscosity fluid are also within the contemplation of this disclosure. Moreover, the seal 45 may be of any configuration that provides a seal between a fixed and rotating element. Moreover, other configurations of a seal could be utilized within the contemplation of this disclosure that separate the motor compartment 84 from the interior space 34.

The example motor generator 22 is supported within the housing 32 and is cooled by way of a plurality of cooling coils 52 that encircle the motor 22. Coolant is circulated through the cooling passages 52 that is supplied with coolant from a storage tank 20. An inlet 54 and outlet 56 are provided through the housing 32 to communicate coolant to the motor generator 22. Coolant maintains the motor generator 22 at a low temperature to reduce electrical resistance and provide a desired operational electrical efficiency. The coolant may be air, nitrogen or other gas provided from the coolant storage tank 20.

The inertial drum 24 is coupled to an input shaft 46 driven by a motor/generator 22. The motor generator 22 is selectively coupled to drive the inertial drum 24 through a clutch 44. The clutch 44 is controlled by a controller 14. The controller 14 may be a dedicated controller for the power system 15 or may be a portion of the overall aircraft controller. A sensor 48 is provided within the housing 32 to measure the rotational speed of the inertial drum 24. The controller 14 is in communication with the sensor 48, the clutch 44 and the motor generator 22 to receive information and command operation. In this example, the controller 14 is in communication with the sensor 48 through the communication link 60. The clutch 44 is in communication with the controller through the schematically shown communications link 62. The motor generator 22 is in communication through the link 64. The controller 14 receives signals from the sensor 48 indicative of a speed of the inertial drum 24. The speed of the inertial drum 24 is utilized to measure and monitor the amount of energy stored by the inertial drum 24. In other words, the speed of the inertial drum 24 represents the amount of energy stored and capable of being withdrawn when needed.

The motor generator 22 is electrically coupled to the battery system 16. The controller 14 commands operation of the motor generator 22 to either drive the inertial drum 24 or to operate as a generator driven by the inertial drum 24. Rotation of the inertial drum 24 by the motor generator 22 adds energy. The motor generator 22 is powered by the battery system 16 or an external power source to input energy into the inertial drum 24. Energy is input by rotating the inertial drum 24 to a defined speed.

Alternatively, the clutch 44 is engaged and the inertial drum 24 and drive the motor generator 22 to generate electric power. The electric power produced can be used to charge the battery system 16 or be provided directly to the propulsors 12. Moreover, electric energy produced by the motor generator 22 can be used for any other systems aboard the aircraft 10 as required.

Figure 3:
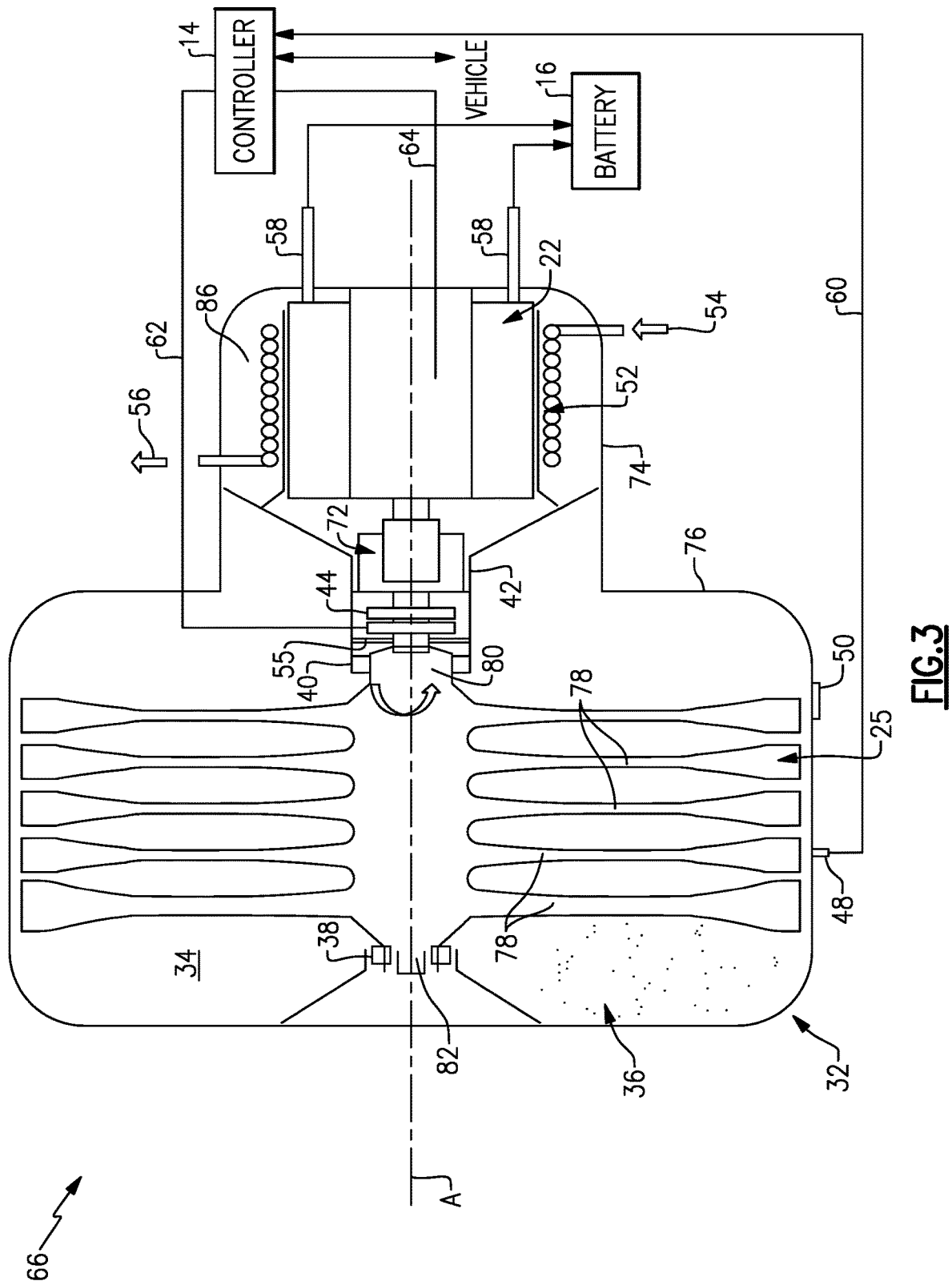
FIG. 3 is a cross-sectional view of another example inertial energy storage device embodiment.

Referring to FIG. 3, with another example inertial energy storage device 66 embodiment is schematically shown and includes a gearbox 72 coupled between the inertial drum 25 and the motor generator 22. A seal 55 is provided between the bearing support 42 and the rotating shaft to separate the interior space 34 from the motor compartment 86. The gearbox 72 provides a speed change ratio that allows the motor generator 22 to spin at a speed higher than the inertial drum 25. In one alternate example embodiment, the gearbox 72 provides a speed change ratio that enables the motor generator 22 to spin the inertial drum 25 to speeds beyond the maximum speed of the motor generator 22. The example gearbox 72 may be of any known gear configuration to provide the desired speed ratio between a rotational speed of the motor generator 22 and inertial drum 25. The clutch 44 remains in use to enable decoupling of the motor generator 22 from the inertial drum 25.

In this example, the inertial drum 25 includes a lessor number of rotors 78 than the rotor portions 26 of the inertial drum 24 embodiment shown in FIG. 2. Use of a gearbox to establish a desired speed at the motor generator interface allows flexibility in the length and diameter of the inertia drum 25 as well as physical size and performance of motor generator 22. The gearbox also enables additional configurations of the inertial energy storage device 18 within aircraft system 10 including angular orientation of the storage device 66. For, example the motor 22 may be mounted in an angular orientation relative to the axis of rotation of the inertial drum 25. The rotor portions 78 are supported by shaft portions 82 and 80. The shaft portions 82, 80 are supported by bearing systems 38, 40. It should be appreciated that although two bearing systems are shown at each end of the inertial drum 25, alternate bearing support configurations including additional bearings disposed at intermediate locations could also be utilized and are within the contemplation of this disclosure. The rotor portion 78 and 26 can be arranged in various configurations to meet application specific requirements and provide the desired duration, speeds of rotation and energy storage capacities.

The inertial energy storage devices 18, 66, illustrated in FIGS. 2 and 3, the inertial drum 24, 25 and motor generator 22 are all disposed along the common axis of rotation A. The common axis of rotation A provides for a decrease in frictional or other mechanical losses that may be incurred during operation. Moreover, the positioning of the motor generator 22 and the inertial drum 24 along the common axis A enables enclosing of the motor generator 22 and inertial drum 24, 25 in a common housing. The housing 32, illustrated in FIG. 3, includes a motor portion 74 and an inertial drum portion 76 that are in communication with each other and include the same low viscosity medium. In other embodiments, the rotor and motor generator environments may be separated by the seals 45, 55 thereby enabling two or more environments to exist within housing 32.

Figure 4:
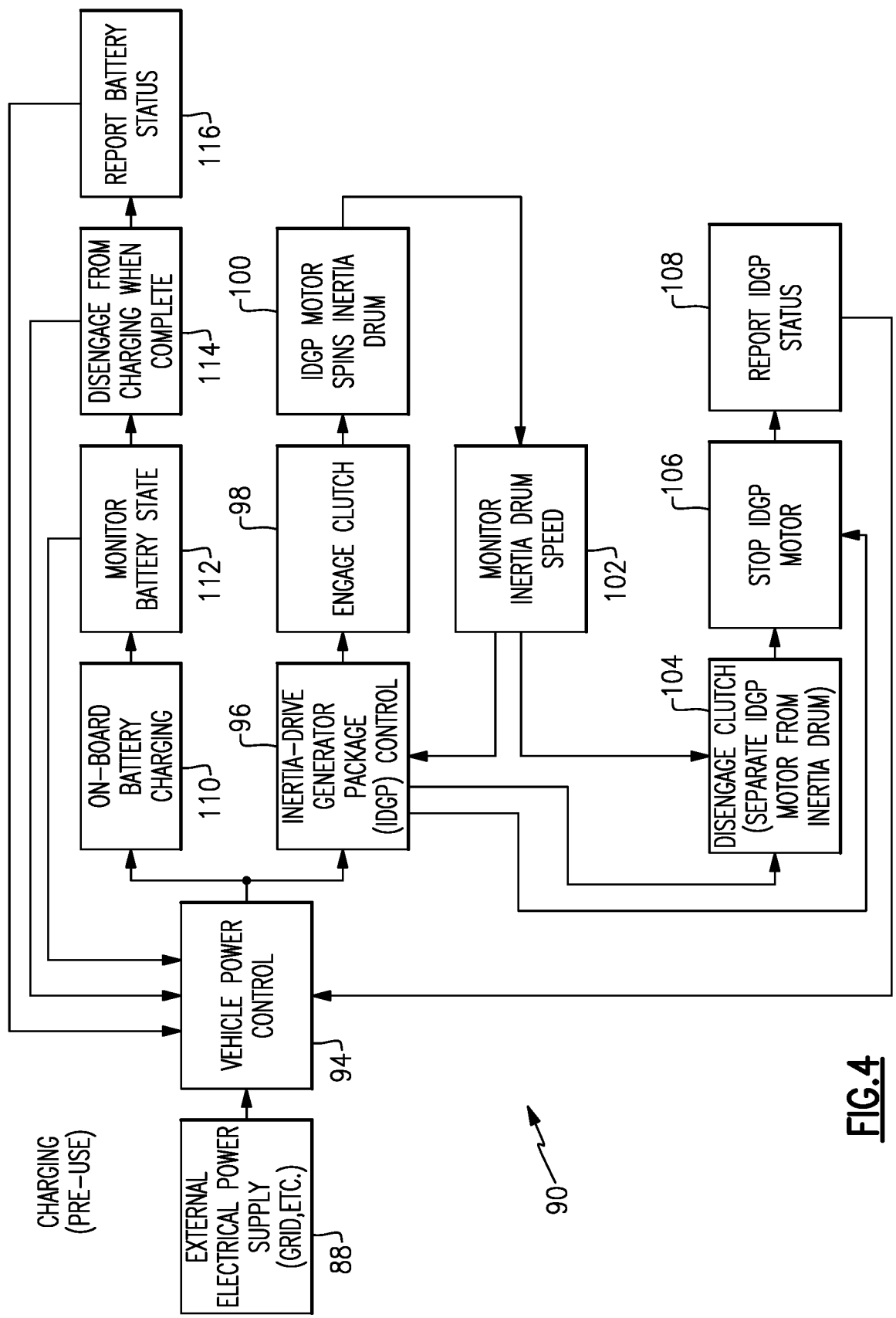
FIG. 4 is a block diagram illustrating an example process of charging the inertial energy storage device.

Referring to FIG. 4, with continued reference to FIGS. 2 and 3, a block diagram of charging of the inertial energy storage devices 18, 66 is schematically shown at 90. In one disclosed operational example, an external power supply 88 is used to drive the motor generator 22 to a speed to initially charge the inertial energy storage device 18, 66. Charging of the inertial energy storage device 18, 66 includes spinning the inertial drum 24, 25 to a predefined speed followed by decoupling of the motor generator 22. The inertial drum 24, 25 continues to rotate in the low friction environment to maintain the potential energy that can be utilized when needed.

The controller 14 control the electrical energy input into the motor generator 22 and battery system 16 from an external power source 88. Application of power from the external power source 88 is controlled by the controller 14 as indicated at 94. The controller 14 governs charging of the battery systems 16 as indicated at 110. Charging of the battery is monitored as indicated at 112 by the controller 14. Once the battery system 16 is completely charged, the controller will disengaged charging as is indicated at 114 and continuously monitor battery status as is indicated at 116. Monitoring the battery status will continue throughout the operation of the aircraft propulsion system.

At the same time as charging of the battery systems 16, or in sequence, the controller 14 will charge the inertial energy storage device 18, 66 as is indicated at 96. To perform the initial charging, the clutch 44 will be engaged as is indicated at 98. The motor generator 22 will spin the inertial drum 24, 25 to speed as is indicated at 100. The controller 14 will monitor the inertial speed of the inertial drum 24, 25 as is indicated at 102, until the predefined speed is reached to store the desired amount of inertial energy. Once the inertial drum 24, 25 is spun to the desired speed, the clutch 44 will be disengaged as is shown schematically at 104. With the clutch disengaged, as indicated at 104, there is no need for the motor generator 22 to be operated and is therefore shut down as is indicated at 106. The speed of the inertial drum will be continually monitored with the speed sensor 48 as is indicated at 108.

Figure 5:
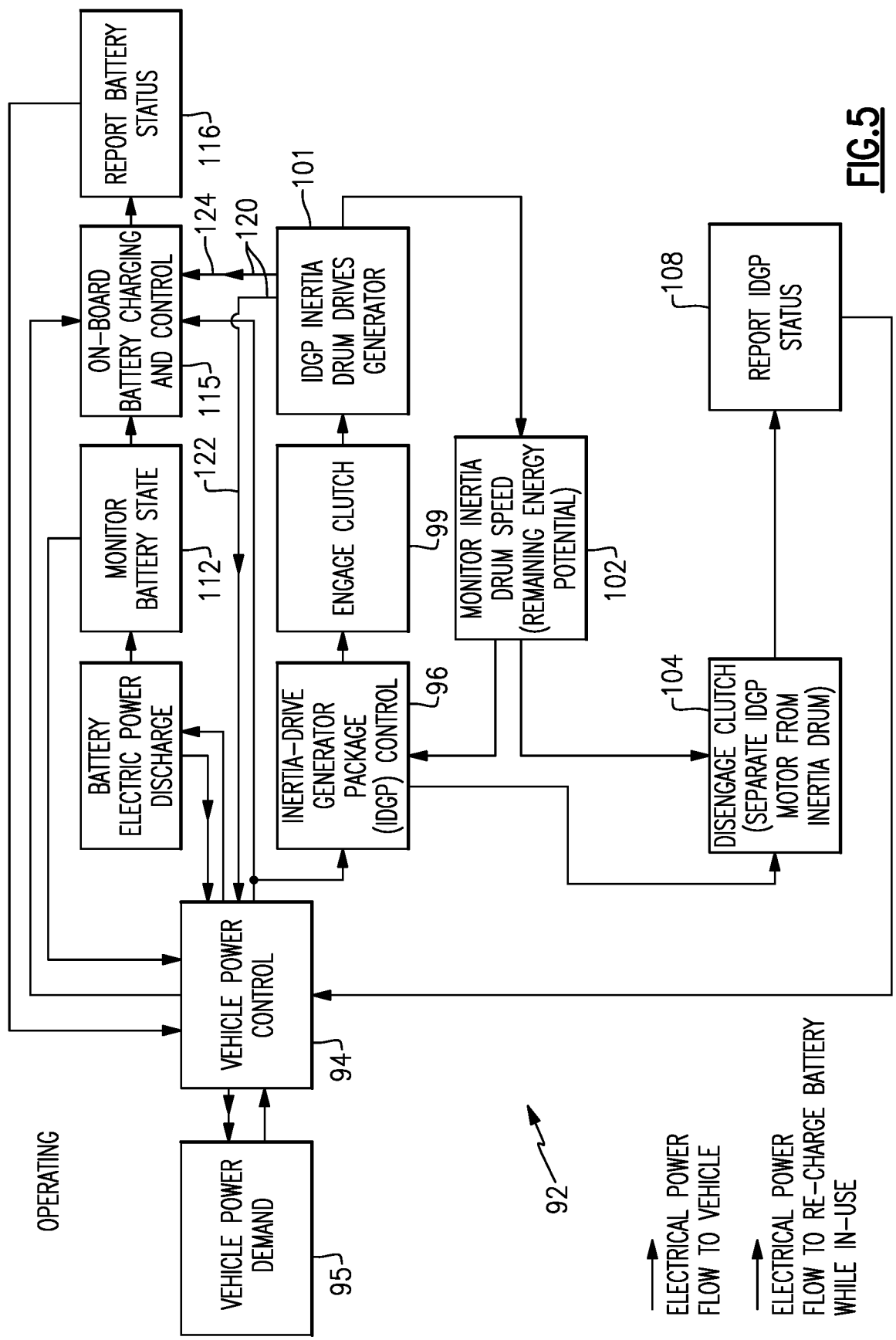
FIG. 5 is a block diagram illustrating operation of the example inertial energy storage device.

Referring to FIG. 5, with continued reference to FIG. 4, functioning of the system 15 is schematically indicated during operation at 92. During operation, the power demand 94 will be monitored by the controller 14 as is indicated at 94. The controller 14 will monitor the battery power discharge and the battery state, as indicated at 112. Battery state at any point during operation may be effected by one or more conditions including initial charge state of the battery, power extracted from the battery, thermal operating condition affecting battery chemistry, age and cyclic charge/discharge history of the battery. When the power demand exceeds the available power that can be provided by the battery systems 16, the inertial power stored in the inertial drive storage device 18, 66 can be tapped as necessary to accomplish the desired operation.

To tap the energy stored in the inertial drive storage device 18, 66, the clutch 44 is engaged to couple the motor generator 22 to the inertial drum 24, 25. Upon coupling to the inertial drum 24, 25, the motor generator 22 begins to spin and generate electricity. The electricity generated, as is indicated at 101, is communicated as an electric output schematically shown at 120. A first portion 124 of the output energy can go towards charging a battery systems 16 as is indicated at 115. A second portion 122 of the output energy can go to other the vehicle power demands as directed by the controller 14. Vehicle power demands can include operation of devices within the aircraft, including the propulsors 12 along with other control and operating systems. The output of energy is monitored, as is indicated at 102, and discontinued by disengaging the clutch 44 once the demand for increased power has subsided or until such time as the potential energy within the inertial energy storage device 18, 66 has been exhausted.

Tapping into energy provided by the inertial storage devices 18, 66 can be done frequently to supplement power during peak times as needed, to provide power to replenish the battery systems 16, and to lengthen the operation capability of the aircraft or subsystems.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft power system comprising:
   a battery;
   a motor/generator coupled to the battery;
   an inertial drum rotatable about an axis of rotation and coupled to the motor/generator, wherein the motor/generator drives rotation of the inertial drum in a first operating mode and is driven by the inertial drum in a second operating mode; and
   a housing defining a chamber for the inertial drum, the chamber filled with low-viscosity medium to reduce friction on the inertial drum.

2. The aircraft power system as recited in claim 1, including a clutch for selectively coupling the motor/generator to the inertial drum.

3. The aircraft power system as recited in claim 2, wherein the inertial drum comprises a plurality of rotors coupled together and the motor/generator through the clutch.

4. The aircraft power system as recited in claim 2, wherein the inertial drum comprises a plurality of integrally formed rotor portions and a shaft portion coupled to the motor/generator.

5. The aircraft power system as recited in claim 1, including a cooling system cooling the motor/generator, the cooling system including conduits for circulating coolant to remove heat from the motor/generator.

6. The aircraft power system as recited in claim 1, including at least one bearing assembly supporting rotation of the inertial drum, wherein the at least one bearing assembly comprises one of a rolling element, fluid film and magnetic bearing.

7. The aircraft power system as recited in claim 1, including a controller governing operation of the motor/generator in a first mode where the motor/generator draws energy from the battery to drive rotation of the inertial drum and a second mode where the inertial drum drives the motor/generator to generate electric energy.

8. The aircraft power system as recited in claim 7, wherein the controller is configured to operate the power system in the second mode in response to a demand for electric power that exceeds the electric power provided by the battery.

9. The aircraft power system as recited in claim 7, including a speed sensor measuring a speed of the inertial drum and communicating a signal indicative of the speed of the inertial drum to the controller.

10. The aircraft power system as recited in claim 1, including a gearbox coupled between the inertial drum and the motor/generator providing a change of speed between the inertial drum and the motor/generator.

11. A method of operating an aircraft power system comprising:
    driving a motor/generator with input electric energy to rotate an inertial drum at a predefined rotational speed;
    decoupling the motor/generator from the inertial drum such that the inertial drum spins freely separate from the motor/generator; and
    coupling the motor/generator to the inertial drum such that the inertial drum drives the motor/generator to produce electric energy in response to a demand for power.

12. The method of operating an aircraft power system as recited in claim 11, including a battery coupled electrically to the motor/generator and the input energy for driving the motor generator is provided by the battery and the electric energy generated by the motor/generator when driven by the inertial drum charged the battery.

13. The method as recited in claim 12, including a speed sensor measuring a speed of the inertial drum and a controller utilizing the measured speed to determine a remaining energy potential stored in the inertial drum.

14. The method as recited in claim 13, including a controller controlling coupling of the motor/generator and the inertial drum to supplement energy stored within the battery.

15. The method as recited in claim 14, including driving the motor/generator at a startup to rotate the inertial drum to a predefined speed, decoupling the motor/generator once the predefined speed is attained and monitoring the rotational speed of the inertial drum to determine the remaining potential energy.

16. The method as recited in claim 15, including withdrawing the stored potential energy in response to a power demand exceeding a capacity of the battery, wherein withdrawal of the potential energy is provided by coupling the inertial drum to the motor/generator to produce electric power.

* * * * *